United States Patent
Ali et al.

(10) Patent No.: US 12,532,350 B2
(45) Date of Patent: Jan. 20, 2026

(54) CONFIGURATION BASED ON A REFERENCE SIGNAL RECEIVED POWER MEASUREMENT

(71) Applicant: Lenovo (Singapore) Pte. Ltd., New Tech Park (SG)

(72) Inventors: Ali Ramadan Ali, Kraiburg am Inn (DE); Sher Ali Cheema, Ilmenau (DE); Ankit Bhamri, Rödermark (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 297 days.

(21) Appl. No.: 18/548,790

(22) PCT Filed: Feb. 28, 2022

(86) PCT No.: PCT/IB2022/051753
§ 371 (c)(1),
(2) Date: Sep. 1, 2023

(87) PCT Pub. No.: WO2022/185184
PCT Pub. Date: Sep. 9, 2022

(65) Prior Publication Data
US 2024/0314833 A1    Sep. 19, 2024

Related U.S. Application Data

(60) Provisional application No. 63/155,264, filed on Mar. 1, 2021.

(51) Int. Cl.
*H04W 74/00*    (2009.01)
*H04B 17/318*    (2015.01)
*H04W 74/0833*    (2024.01)

(52) U.S. Cl.
CPC ........ *H04W 74/006* (2013.01); *H04B 17/328* (2023.05); *H04W 74/0833* (2013.01)

(58) Field of Classification Search
CPC ............ H04W 74/006; H04W 74/0833; H04B 17/328; H04B 17/24; H04B 17/318; H04L 27/26132
See application file for complete search history.

(56) References Cited

U.S. PATENT DOCUMENTS

| 10,587,363 B2 | 3/2020 | Zhou et al. |
| 12,004,171 B2 * | 6/2024 | Harada ................. H04L 5/0053 |

(Continued)

FOREIGN PATENT DOCUMENTS

EP    3780871 A1    2/2021

OTHER PUBLICATIONS

PCT/IB2022/051753, "International Search Report and the Written Opinion of the International Searching Authority, or the Declaration", International Searching Authority, May 31, 2022, pp. 1-13.

(Continued)

*Primary Examiner* — Abdullahi Ahmed
(74) *Attorney, Agent, or Firm* — Kunzler Bean & Adamson

(57) ABSTRACT

Apparatuses, methods, and systems are disclosed for a configuration based on a reference signal received power measurement. One method includes receiving, a first configuration including a number of repetitions for a random access response (RAR) physical downlink control channel (PDCCH) and quasi-co-location (QCL) assumption associated with a demodulation reference signal (DMRS) of each repetition of the number of repetitions for the RAR PDCCH. The method includes performing reference signal received power (RSRP) measurements on the DMRS associated with each repetition of the number of repetitions for the RAR PDCCH. The method includes transmitting a message 3 to the network. The message 3 includes a RSRP measurement for at least one of the DMRS associated with each repetition (Continued)

of the number of repetitions for the RAR PDCCH and the corresponding QCL assumption.

20 Claims, 7 Drawing Sheets

(56) References Cited

U.S. PATENT DOCUMENTS

| | | | | |
|---|---|---|---|---|
| 2020/0366388 | A1* | 11/2020 | Kakishima | H04B 7/00 |
| 2021/0051707 | A1* | 2/2021 | Rastegardoost | H04L 5/10 |
| 2021/0111817 | A1* | 4/2021 | Khoshnevisan | H04W 24/08 |
| 2022/0232546 | A1* | 7/2022 | Hakola | H04W 48/12 |
| 2023/0353212 | A1* | 11/2023 | Guo | H04B 7/0626 |
| 2024/0305352 | A1* | 9/2024 | Harada | H04B 7/06964 |

OTHER PUBLICATIONS

CMCC, "Discussion on channel access mechanism for above 52.6GHz", 3GPP TSG RAN WG1 #101 R1-2003962, May 25-Jun. 5, 2020, pp. 1-3.

3GPP, "3rd Generation Partnership Project; Technical Specification Group Radio Access Network; NR; Requirements for support of radio resource management (Release 17)", 3GPP TS 38.133 V17.0.0, Dec. 2020, pp. 1-1812.

3GPP, "3rd Generation Partnership Project; Technical Specification Group Radio Access Network; NR; Physical channels and modulation (Release 16)", 3GPP TS 38.211 V16.4.0, Dec. 2020, pp. 1-133.

3GPP, "3rd Generation Partnership Project; Technical Specification Group Radio Access Network; NR; Multiplexing and channel coding (Release 16)", 3GPP TS 38.212 V16.4.0, Dec. 2020, pp. 1-152.

3GPP, "3rd Generation Partnership Project; Technical Specification Group Radio Access Network; NR; Physical layer procedures for control (Release 16)", 3GPP TS 38.213 V16.4.0, Dec. 2020, pp. 1-181.

3GPP, "3rd Generation Partnership Project; Technical Specification Group Radio Access Network; NR; Physical layer procedures for data (Release 16)", 3GPP TS 38.214 V16.4.0, Dec. 2020, pp. 1-169.

3GPP, "3rd Generation Partnership Project; Technical Specification Group Radio Access Network; NR; Medium Access Control (MAC) protocol specification (Release 16)", 3GPP TS 38.321 V16.3.0, Dec. 2020, pp. 1-156.

3GPP, "3rd Generation Partnership Project; Technical Specification Group Radio Access Network; NR; Radio Resource Control (RRC) protocol specification (Release 16)", 3GPP TS 38.331 V16.3.1, Jan. 2021, pp. 1-932.

* cited by examiner

CONFIGURATION BASED ON A REFERENCE SIGNAL RECEIVED POWER MEASUREMENT

CROSS-REFERENCE TO RELATED APPLICATIONS

This application claims priority to U.S. Patent Application Ser. No. 63/155,264 entitled "APPARATUSES, METHODS, AND SYSTEMS FOR BEAM CORRESPONDENCE UPDATE FOR ENHANCING DL DURING INITIAL ACCESS" and filed on Mar. 1, 2021 for Ali Ramadan Ali, which is incorporated herein by reference in its entirety.

FIELD

The subject matter disclosed herein relates generally to wireless communications and more particularly relates to a configuration based on a reference signal received power measurement.

BACKGROUND

In certain wireless communications networks, a beam may be used for random access resource selection. In such networks, an environmental change may result in performance degradation.

BRIEF SUMMARY

Methods for a configuration based on a reference signal received power measurement are disclosed. Apparatuses and systems also perform the functions of the methods. One embodiment of a method includes receiving, at a user equipment (UE), a first configuration from a network device. The first configuration includes a number of repetitions for a random access response (RAR) physical downlink control channel (PDCCH) and quasi-co-location (QCL) assumption associated with a demodulation reference signal (DMRS) of each repetition of the number of repetitions for the RAR PDCCH. In some embodiments, the method includes performing reference signal received power (RSRP) measurements on the DMRS associated with each repetition of the number of repetitions for the RAR PDCCH. In certain embodiments, the method includes transmitting a message 3 to the network. The message 3 includes a RSRP measurement for at least one of the DMRS associated with each repetition of the number of repetitions for the RAR PDCCH and the corresponding QCL assumption. In various embodiments, the method includes receiving a second configuration for message 4 repetitions or an indication to receive message 4 repetitions based on RSRP measurement of the RAR PDCCH.

One apparatus for a configuration based on a reference signal received power measurement includes a user equipment. In some embodiments, the apparatus includes a receiver that receives a first configuration from a network device. The first configuration includes a number of repetitions for a random access response (RAR) physical downlink control channel (PDCCH) and quasi-co-location (QCL) assumption associated with a demodulation reference signal (DMRS) of each repetition of the number of repetitions for the RAR PDCCH. In various embodiments, the apparatus includes a processor that performs reference signal received power (RSRP) measurements on the DMRS associated with each repetition of the number of repetitions for the RAR PDCCH. In certain embodiments, the apparatus includes a transmitter that transmits a message 3 to the network. The message 3 includes a RSRP measurement for at least one of the DMRS associated with each repetition of the number of repetitions for the RAR PDCCH and the corresponding QCL assumption. The receiver receives a second configuration for message 4 repetitions or an indication to receive message 4 repetitions based on RSRP measurement of the RAR PDCCH.

Another embodiment of a method for a configuration based on a reference signal received power measurement includes transmitting, from a network device, a first configuration to a user equipment (UE). The first configuration includes a number of repetitions for a random access response (RAR) physical downlink control channel (PDCCH) and quasi-co-location (QCL) assumption associated with a demodulation reference signal (DMRS) of each repetition of the number of repetitions for the RAR PDCCH. In some embodiments, the method includes receiving a message 3 from the UE. The message 3 includes a RSRP measurement for at least one of the DMRS associated with each repetition of the number of repetitions for the RAR PDCCH and the corresponding QCL assumption. In certain embodiments, the method includes transmitting a second configuration for message 4 repetitions or an indication to receive message 4 repetitions based on RSRP measurement of the RAR PDCCH.

Another apparatus for a configuration based on a reference signal received power measurement includes a network device. In some embodiments, the apparatus includes a transmitter that transmits a first configuration to a user equipment (UE). The first configuration includes a number of repetitions for a random access response (RAR) physical downlink control channel (PDCCH) and quasi-co-location (QCL) assumption associated with a demodulation reference signal (DMRS) of each repetition of the number of repetitions for the RAR PDCCH. In various embodiments, the apparatus includes a receiver that receives a message 3 from the UE. The message 3 includes a RSRP measurement for at least one of the DMRS associated with each repetition of the number of repetitions for the RAR PDCCH and the corresponding QCL assumption. The transmitter that transmits a second configuration for message 4 repetitions or an indication to receive message 4 repetitions based on RSRP measurement of the RAR PDCCH.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
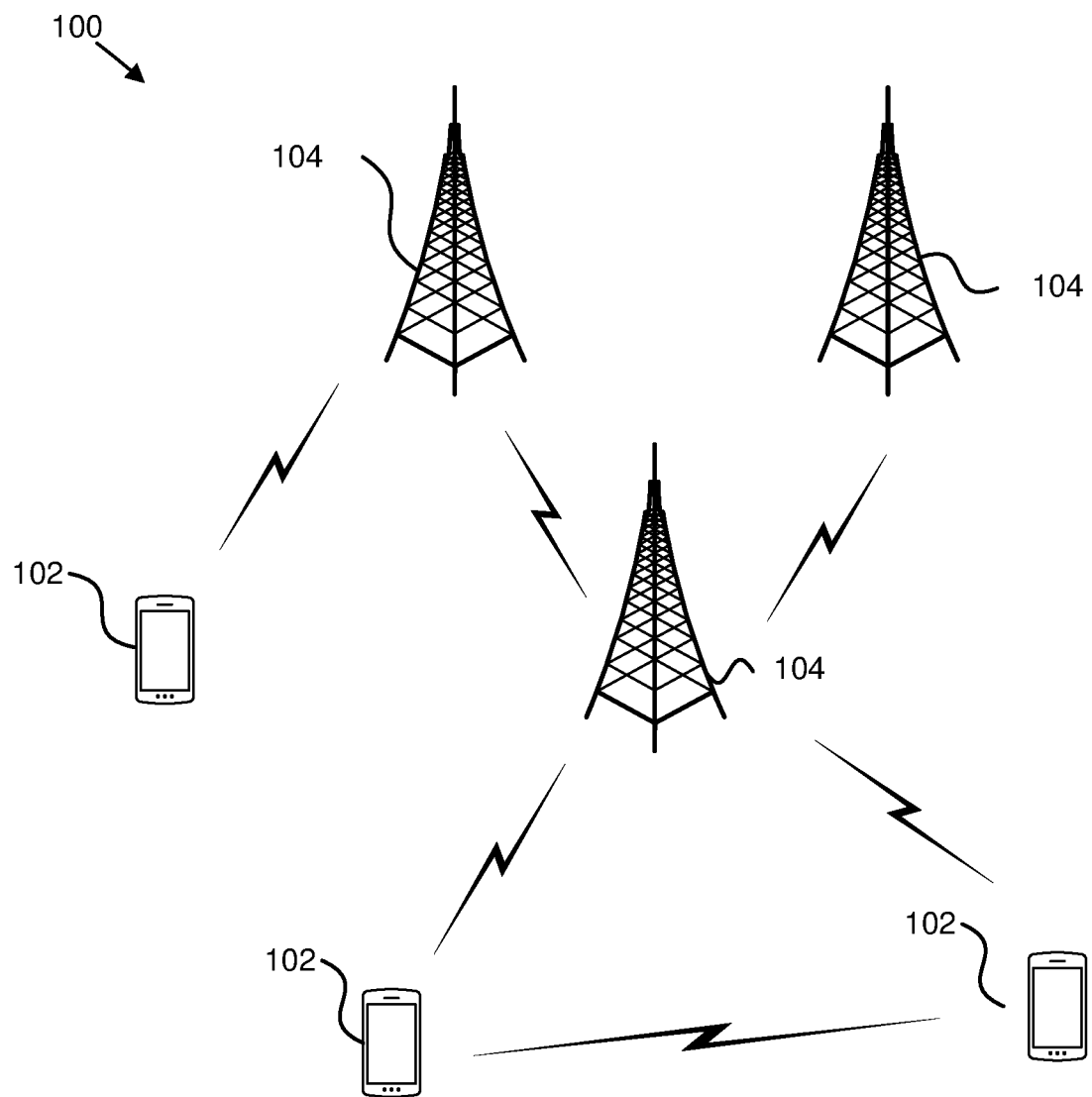
FIG. 1 is a schematic block diagram illustrating one embodiment of a wireless communication system for a configuration based on a reference signal received power measurement.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including." "comprising." "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for a configuration based on a reference signal received power measurement. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth R, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may receive, at a user equipment (UE), a first configuration from a network device. The first configuration includes a number of repetitions for a random access response (RAR) physical downlink control channel (PDCCH) and quasi-co-location (QCL) assumption associated with a demodulation reference signal (DMRS) of each repetition of the number of repetitions for the RAR PDCCH. In some embodiments, the remote unit 102 may perform reference signal received power (RSRP) measurements on the DMRS associated with each repetition of the number of repetitions for the RAR PDCCH. In certain embodiments, the remote unit 102 may transmit a message 3 to the network. The message 3 includes a RSRP measurement for at least one of the DMRS associated with each repetition of the number of repetitions for the RAR PDCCH and the corresponding QCL assumption. In various embodiments, the remote unit 102 may receive a second configuration for message 4 repetitions or an indication to receive message 4 repetitions based on RSRP measurement of the RAR PDCCH. Accordingly, the remote unit 102 may be used for a configuration based on a reference signal received power measurement.

In certain embodiments, a network unit 104 may transmit a first configuration to a user equipment (UE). The first configuration includes a number of repetitions for a random access response (RAR) physical downlink control channel (PDCCH) and quasi-co-location (QCL) assumption associated with a demodulation reference signal (DMRS) of each repetition of the number of repetitions for the RAR PDCCH. In some embodiments, the network unit 104 may receive a message 3 from the UE. The message 3 includes a RSRP measurement for at least one of the DMRS associated with each repetition of the number of repetitions for the RAR PDCCH and the corresponding QCL assumption. In certain embodiments, the network unit 104 may transmit a second configuration for message 4 repetitions or an indication to receive message 4 repetitions based on RSRP measurement of the RAR PDCCH. Accordingly, the network unit 104 may be used for a configuration based on a reference signal received power measurement.

Figure 2:
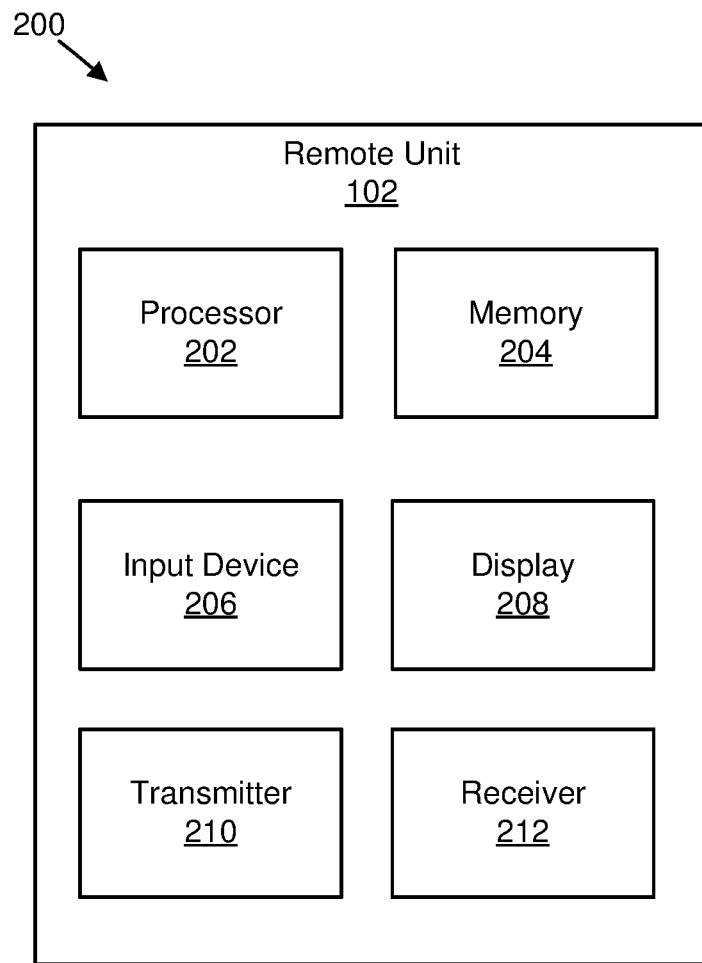
FIG. 2 is a schematic block diagram illustrating one embodiment of an apparatus that may be used for a configuration based on a reference signal received power measurement.

FIG. 2 depicts one embodiment of an apparatus 200 that may be used for a configuration based on a reference signal received power measurement. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the receiver 212 receives a first configuration from a network device. The first configuration includes a number of repetitions for a random access response (RAR) physical downlink control channel (PDCCH) and quasi-co-location (QCL) assumption associated with a demodulation reference signal (DMRS) of each repetition of the number of repetitions for the RAR PDCCH. In various embodiments, the processor 202 performs reference signal received power (RSRP) measurements on the DMRS associated with each repetition of the number of repetitions for the RAR PDCCH. In certain embodiments, the transmitter 210 transmits a message 3 to the network. The message 3 includes a RSRP measurement for at least one of the DMRS associated with each repetition of the number of repetitions for the RAR PDCCH and the corresponding QCL assumption. The receiver 212 receives a second configuration for message 4 repetitions or an indication to receive message 4 repetitions based on RSRP measurement of the RAR PDCCH.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
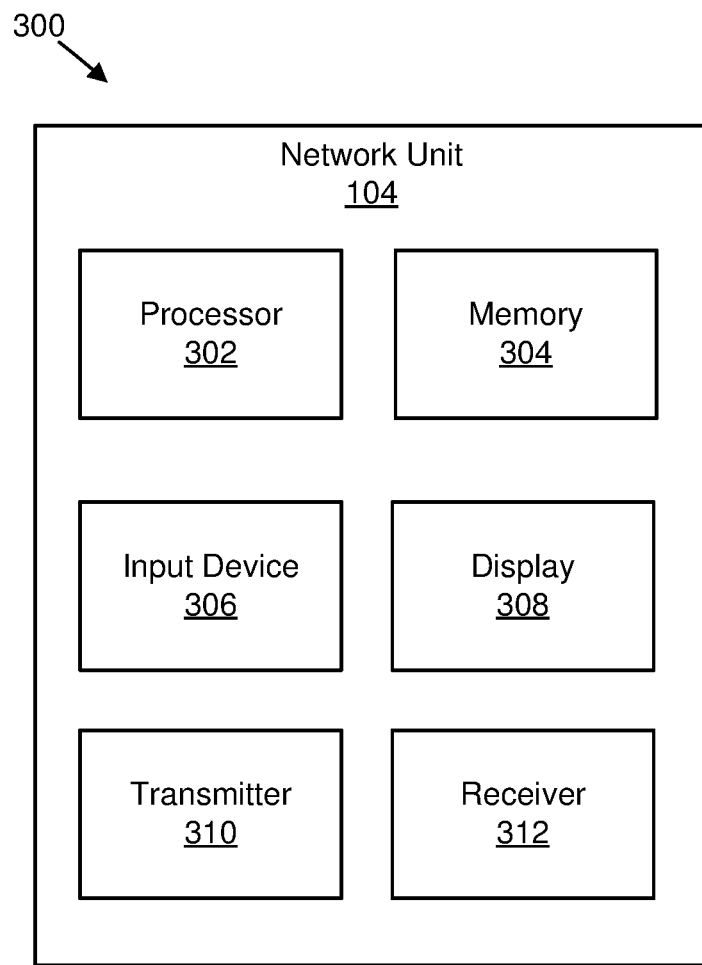
FIG. 3 is a schematic block diagram illustrating one embodiment of an apparatus that may be used for a configuration based on a reference signal received power measurement.

FIG. 3 depicts one embodiment of an apparatus 300 that may be used for a configuration based on a reference signal received power measurement. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the transmitter 310 transmits a first configuration to a user equipment (UE). The first configuration includes a number of repetitions for a random access response (RAR) physical downlink control channel (PDCCH) and quasi-co-location (QCL) assumption associated with a demodulation reference signal (DMRS) of each repetition of the number of repetitions for the RAR PDCCH. In various embodiments, the receiver 312 receives a message 3 from the UE. The message 3 includes a RSRP measurement for at least one of the DMRS associated with each repetition of the number of repetitions for the RAR PDCCH and the corresponding QCL assumption. The transmitter 310 transmits a second configuration for message 4 repetitions or an indication to receive message 4 repetitions based on RSRP measurement of the RAR PDCCH.

It should be noted that one or more embodiments described herein may be combined into a single embodiment. In certain embodiments, coverage of initial access channels and signals may cause a bottleneck due to an environment change during an initial access procedure and an attenuation loss specially at a high frequency (e.g., beyond 52.6 GHZ), and due to the beam being used for initial access as a low gain wide beam that depends on synchronization signal broadcast ("SSB") beams. In some embodiments, a second message ("Msg2") and/or a fourth message ("Msg4") transmission may be expected to use the same transmit ("TX") spatial filter as the receive ("RX") spatial filter used to receive SSB beams at a user equipment ("UE"). In such embodiments, these beams are coarser than that are used for control and/or data transmission in a connected mode, and, hence, the coverage of these messages may be limited specially at high frequencies. Further, in such embodiments, it may happen that after the UE sends a physical random access channel ("PRACH") transmission, it can't successfully decode the second message and/or the fourth message due to an environment change that affects the quality of a downlink ("DL") beam that corresponds to the detected SSB. The UE, during synchronization, may detect a reflected (e.g., not a proper) beam due to shadowing and/or blockage of a direct beam and during receiving random access response the environment changes, but the gNB may still use the same DL beam used for the detected SSB.

In various embodiments, such as in new radio ("NR"), the second message and/or the fourth message physical downlink shared channel ("PDSCH") doesn't support beam management and use quasi-co-location ("QCL") with a selected SSB beam for random access resource selection and, hence, suffer from performance and/or coverage degradation due to an environment change. Therefore, there may be enhancement to the second message and/or the fourth message physical downlink control channel ("PDCCH") and/or PDSCH to avoid beam failure during initial access.

In certain embodiments, there may be procedures and signaling methods for enhancing DL transmission coverage during initial access by: 1) updating beam correspondence using multiple random access response ("RAR") PDCCH ("RAR-PDCCH") repetitions, where each repetition is associated with different beam correspondence: 2) reporting, in Msg3, the updated beam correspondence based on measurements of RAR-PDCCH: 3) updating of the beam correspondence for enhancing Msg4, used for contention resolution, and the following messages; and/or 4) using channel state information ("CSI") reference signal ("RS") ("CSI-RS") along with a RAR message for an early CSI report on Msg3.

Various embodiments herein enable fast updating of beam correspondence during an initial access for enhancing coverage and/or reliability of DL and/or UL messages with and without using CSI-RS. In such embodiments, sending multiple beams along with repetition for RAR-PDCCH enhances detection performance of RAR (e.g., Msg2).

In a first embodiment, a PDCCH demodulation reference signal ("DMRS") may be used for updating a beam correspondence.

In a second embodiment, there may be a configuration for receiving repetition of RAR-PDCCH on different beams. According to the second embodiment, a UE receives a configuration from a base station in system information blocks ("SIBs") related to receiving and/or decoding a RAR used for responding to a random access channel ("RACH") preamble and for an UL grant of Msg3. The configuration contains at least a number of repetitions for RAR PDCCH and corresponding (e.g., different) quasi-co-location ("QCL") assumptions (e.g., including QCL Type-D) for the associated DMRS for each repetition. During synchronization, the UE measures SSB and uses RACH occasion (RO) for PRACH transmission corresponding to the SSB with the best reference signal received power ("RSRP"). Upon decoding PRACH and identifying an SSB index that the UE has detected, the gNB sends a PDCCH part of a RAR message with multiple repetitions. Each repetition (e.g., number of orthogonal frequency division multiplexing ("OFDM") symbols) with DMRS QCLed with DMRS of different SSB indexes and uses the same default QCL for transmitting a PDSCH part as shown in FIG. 4.

Figure 4:
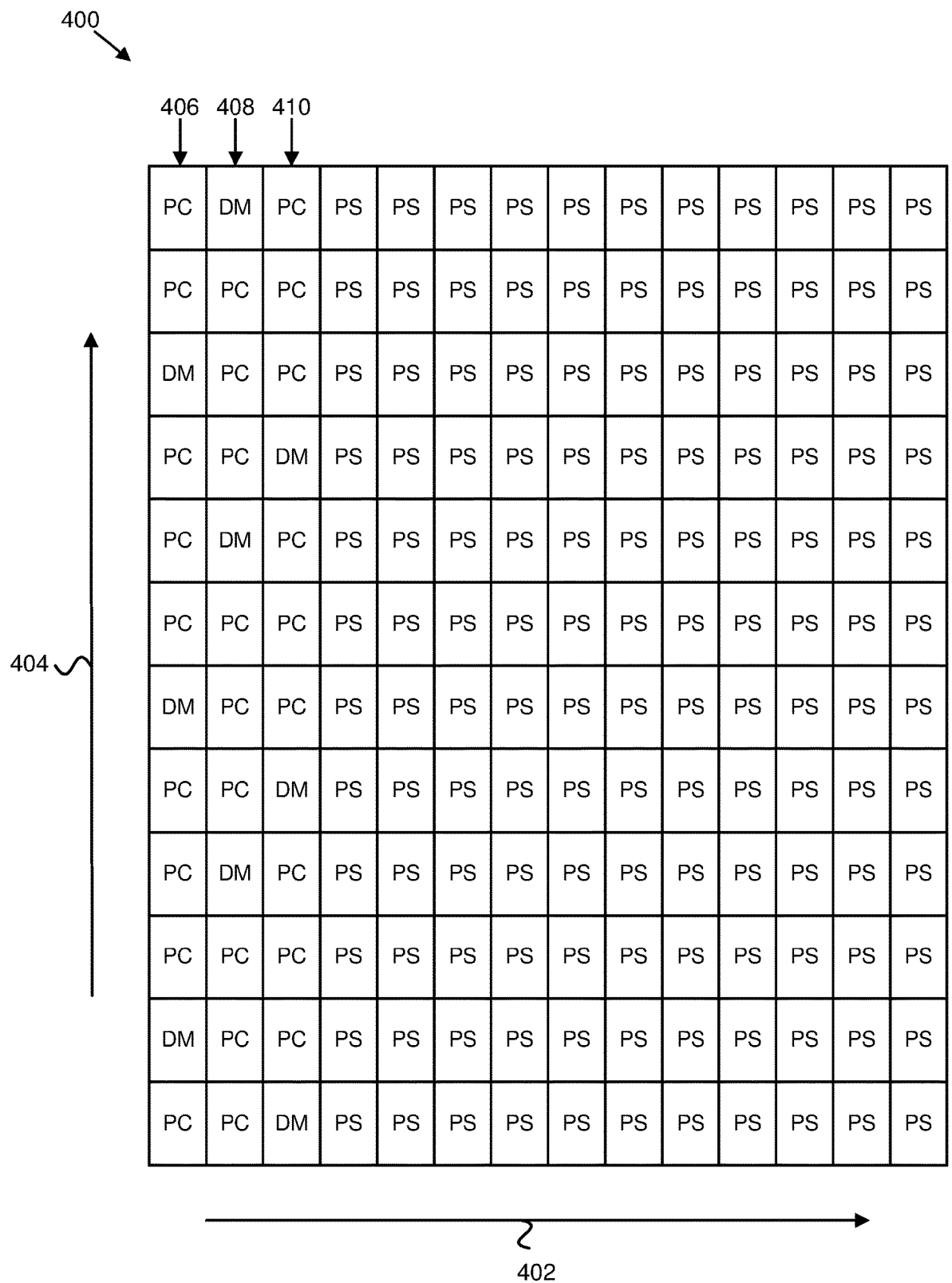
FIG. 4 is a schematic block diagram illustrating one embodiment of RAR-PDCCH repetition with PDCCH DMRS.

FIG. 4 is a schematic block diagram 400 illustrating one embodiment of RAR-PDCCH repetition with PDCCH DMRS over a time 402 and frequency 404. The system block diagram 400 illustrates symbols carrying RAR-PDCCH ("PC"), PDCCH-DMRS ("DM"), and RAR-PDSCH ("PS") including a first repetition 406, a second repetition 408, and a third repetition 410. The first repetition 406 is QCLed with a first SSB, the second repetition 408 is QCLed with a second SSB, and the third repetition 410 is QCLed with a third SSB.

In one implementation of the second embodiment, the gNB sends RAR-PDCCH repetitions with DMRS corresponding to the neighbor SSBs to the detected SSB by the UE (e.g., if the UE detects SSBn) and configured with 3 RAR-PDCCH repetitions, then the DMRS of these repetitions are QCLed with SSBn−1. SSBn. SSBn+1. In another implementation of the second embodiment, the gNB sends RAR-PDCCH with repetitions and correspondence with the swept SSBs since RAR-PDCCH is broadcasted commonly for all UEs. For example, if a number of SSBs is 8, the gNB sends 8 repetitions of RAR-PDCCH and configures the UEs in a SIB to use a subset of these repetitions which are QCLed with the neighbor SSBs to their detected SSB (e.g., a first UE that has detected SSBn uses the repetitions with QCL of SSBn−1. SSBn. SSBn+1 for receiving the common RAR-PDCCH while a second UE that has detected SSBm uses the ones correspond to SSBm−1. SSBm. SSBm+1). In a further implementation of the second embodiment, the UE may be configured to receive RAR-PDCCH with a number of repetitions higher than a number of DMRS QCL assumptions. In such an implementation, the repetitions are grouped in OFDM symbols and each group of repetitions uses DMRS associated and/or QCLed with one SSB.

In some embodiments, a number of RAR PDCCH repetitions is fixed in a specification and no indication in a configuration is needed such that a UE is always expected to receive a fixed number of repetitions for RAR PDCCH. In such embodiments, a corresponding QCL assumption for DMRS associated with each PDCCH repetition is based on the QCL assumption of neighboring SSB beams relative to best reported SSB beams.

In various embodiments, a number of RAR PDCCH repetitions is implicitly determined based on a number of best SSB beams indicated by a UE to a gNB. For example, if the UE sweeps through 32 SSB beams and indicates 4 best SSB beams, then the UE is expected to receive 4 RAR PDCCH repetitions where the QCL assumption of the associated DMRS is based on the 4-best reported SSB beams. The first repetition's DMRS is QCLed with the first best SSB beam, the second repetition's DMRS is QCLed with the second best SSB beam, and so forth.

In a third embodiment, there may be measurement of DMRS for enhancing RAR-PDCCH detection performance. According to the third embodiment, a UE is configured to either use its default RX spatial filter for receiving the multiple repetitions or may be configured to switch the RX beam corresponding to the different QCL assumptions of the different repetitions. The UE is further configured with an RSRP threshold for the measured DMRS RSRP ("DMRS-RSRP"). The UE performs channel estimation and equalization individually on each repeated RAR-PDCCH using the corresponding DMRS QCL assumptions. In one implementation of the third embodiment, upon measuring the RSRP of the DMRS for each repetition, the UE performs decoding of the downlink control information ("DCI") on the repetition with the highest DMRS-RSRP. In another implementation of the third embodiment, the UE combines the equalized symbols from all repetitions or combines the soft bits from all repetitions after demodulation then performs DCI decoding. In a further implementation of the third embodiment, the UE uses only a sub-set of the equalized repetitions for combining based on the measured RSRP from the different DMRS ports and the configured DMRS-RSRP threshold.

In a fourth embodiment, there may be UE reporting of beam correspondence in Msg3. According to the fourth embodiment, the UE is configured implicitly or explicitly to report the beam correspondence update using Msg3. Upon measuring the DMRS-RSRP of the different repetitions, the UE reports these values to the gNB. In one implementation of the fourth embodiment, reporting of a number of configured repetitions is pre-defined in a specification or indicated in a SIB. In another implementation of the fourth embodiment, the UE reports the RSRP of all configured repetitions, if not specified. In a further implementation of the fourth embodiment, the UE reports only the RSRPs with a high value based on a pre-defined threshold. In alternative implementation of the fourth embodiment, the UE reports only the highest RSRP. In yet another implementation of the fourth embodiment, the UE reports only the SSB IDs corresponding to the QCL assumptions of DMRS (e.g., associated with each repetition) with the highest RSRP or reports only one SSB identifier ("ID") corresponding to the strongest RSRP.

In certain embodiments, a UE performs Msg3 repetitions with the same number of repetitions corresponding to the RAR PDCCH repetitions and each Msg3 repetition is performed with corresponding QCL assumptions associated with RAR PDCCH repetitions. For example, if a first RAR PDCCH is received with QCL assumption 1, then first Msg3 repetitions are also performed with the same corresponding QCL assumption 1, and so forth.

In a fifth embodiment, there may be Msg4 enhancements. According to the fifth embodiment, a gNB uses beams identified by a UE in a report that is sent in Msg3. The UE is configured to receive Msg4 (e.g., both PDCCH and PDSCH) with a QCL assumption corresponding to the highest RSRP among RAR-PDCCH repetitions. If the UE is configured to report multiple RSRPs or multiple SSB IDs in Msg3, then the UE is expected to assume a QCL of the Msg4-PDCCH QCLed with the SSB ID corresponding to the strongest RSRP among RAR-PDCCH repetitions and in the DCI of Msg4-PDCCH it receives transmission configuration indicator ("TCI") states for QCL assumptions of Msg4-PDSCH repetitions with multiple beams QCLed with the rest of the reported SSB IDs. In one implementation of the fifth embodiment, the UE expects the same number of Msg4-PDCCH and/or Msg4-PDSCH repetitions QCLed with the SSB IDs ("SSB-IDs") that are used for a beam corresponding update in Msg3.

Figure 5:
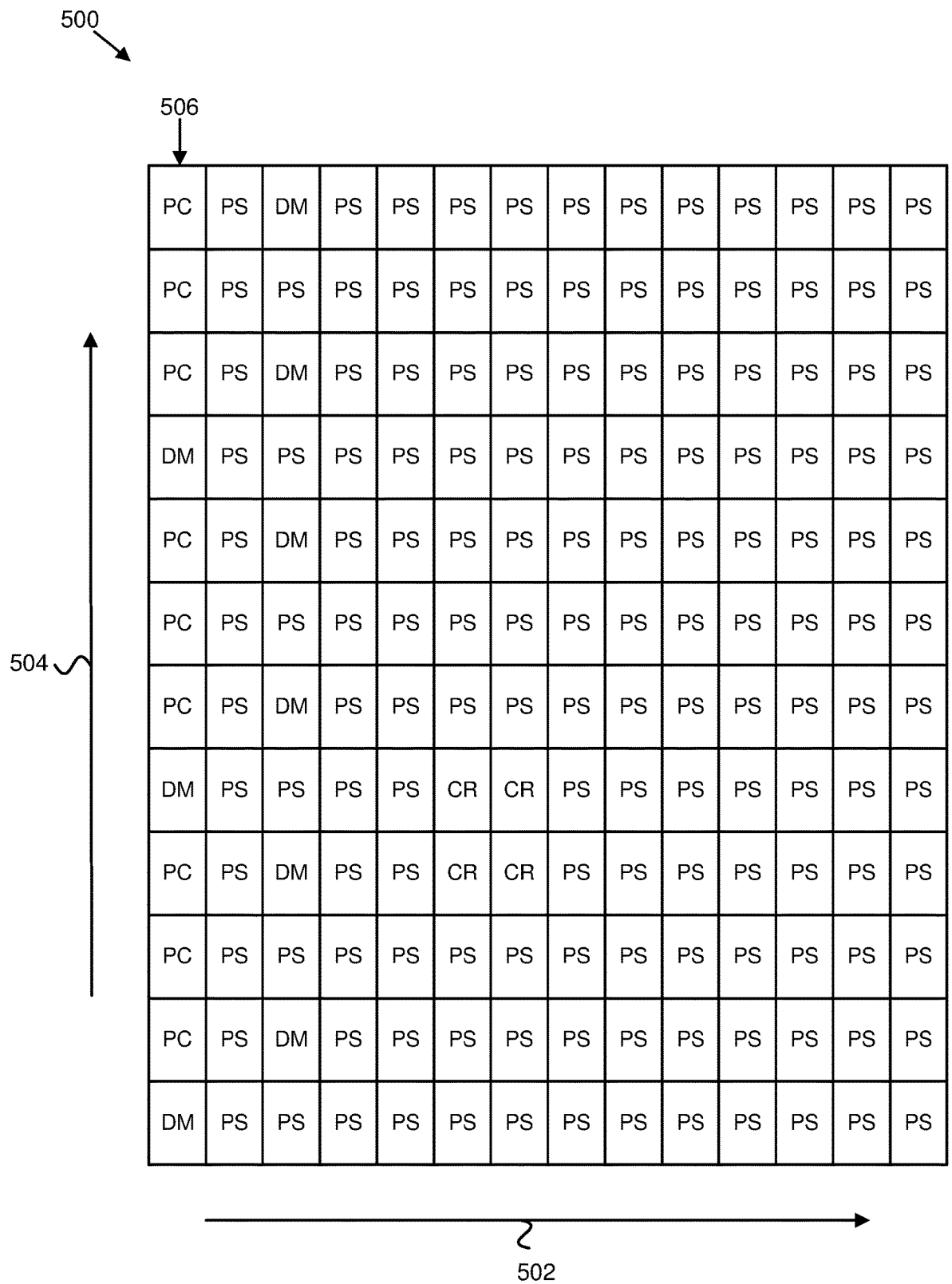
FIG. 5 is a schematic block diagram illustrating one embodiment of multi-port CSI-RS in DL RAR-PDSCH.

In a sixth embodiment, multi-port CSI-RS may be used for updating beam correspondence. According to the sixth embodiment, a UE receives a configuration from a base station in SIBs related to the resources and a number of ports used for transmitting CSI-RS time division multiplexed ("TDMed") with PDSCH as depicted in FIG. 5. During synchronization, the UE measures SSB and uses the RO for PRACH transmission corresponding to the SSB with the best RSRP. Upon decoding PRACH and identifying the SSB index that the UE has detected, the gNB sends in RAR PDSCH ("RAR-PDSCH") multi-port CSI-RS with QCLs correspond to the neighbor SSBs of the detected SSB by the UE. The UE is configured to report the beam correspondence update using Msg3 upon measuring different CSI-RS. In one implementation of the sixth embodiment, the UE reports the CSI-RS resource index ("CRI") RSRP ("CRI-RSRP") of all CSI-RS ports. In another implementation of the sixth embodiment, the UE reports only the RSRPs with the highs value based on a pre-defined threshold. In a further implementation of the sixth embodiment, the UE reports the highest RSRP.

FIG. 5 is a schematic block diagram 500 illustrating one embodiment of multi-port CSI-RS in DL RAR-PDSCH over a time 502 and frequency 504. The system block diagram 500 illustrates symbols carrying RAR-PDCCH ("PC"), RAR-PDSCH ("PS"), DMRS ("DM"), and CSI-RS ("CR") including a PDCCH 506, and CSI-RS (e.g., 4Ps, frequency division ("FD") and/or time division ("TD") code division multiplexing ("CDM") ("TD-CDM")) correspondingly QCLed to 4 SSBs.

In yet another implementation of the sixth embodiment, the UE reports only the SSB IDs corresponding to a set of CSI-RS ports with the highest RSRP or reports only one SSB ID corresponds to the strongest RSRP of one of the CSI-RS. The UE is configured to receive Msg4 with a QCL assumption corresponding to the highest CSI-RS RSRP. If the UE is configured to report, in Msg3, multiple RSRPs of multiple CSI-RS or multiple corresponding SSB IDs, then the UE is expected to assume QCL of the Msg4-PDCCH QCLed with the CSI-RS and/or SSB ID corresponding to the strongest RSRP among CSI-RS ports and, in the DCI of Msg4-PDCCH, it receives TCI states for QCL assumptions of Msg4-PDSCH repetitions with multiple beams QCLed with the rest of the reported CSI-RS RSRP and/or SSB IDs.

Figure 6:
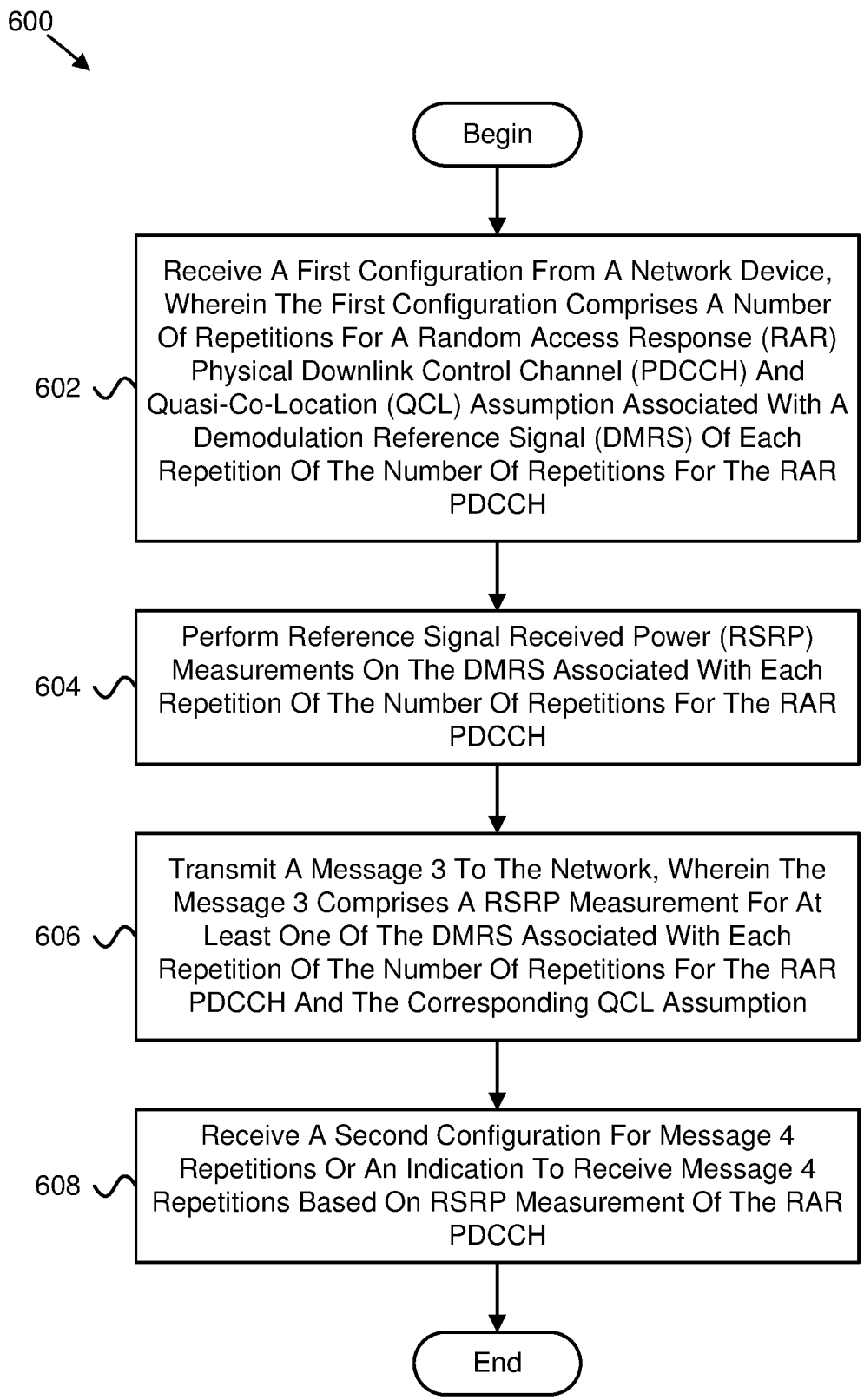
FIG. 6 is a flow chart diagram illustrating one embodiment of a method for a configuration based on a reference signal received power measurement.

FIG. 6 is a flow chart diagram illustrating one embodiment of a method 600 for a configuration based on a reference signal received power measurement. In some embodiments, the method 600 is performed by an apparatus, such as the remote unit 102. In certain embodiments, the method 600 may be performed by a processor executing program code, for example, a microcontroller, a microprocessor, a CPU, a GPU, an auxiliary processing unit, a FPGA, or the like.

In various embodiments, the method 600 includes receiving 602, at a user equipment (UE), a first configuration from a network device. The first configuration includes a number of repetitions for a random access response (RAR) physical downlink control channel (PDCCH) and quasi-co-location (QCL) assumption associated with a demodulation reference signal (DMRS) of each repetition of the number of repetitions for the RAR PDCCH. In some embodiments, the method 600 includes performing 604 reference signal received power (RSRP) measurements on the DMRS associated with each repetition of the number of repetitions for the RAR PDCCH. In certain embodiments, the method 600 includes transmitting 606 a message 3 to the network. The message 3 includes a RSRP measurement for at least one of the DMRS associated with each repetition of the number of repetitions for the RAR PDCCH and the corresponding QCL assumption. In various embodiments, the method 600 includes receiving 608 a second configuration for message 4 repetitions or an indication to receive message 4 repetitions based on RSRP measurement of the RAR PDCCH.

In certain embodiments, the first configuration is received from the network device in system information blocks (SIBs). In some embodiments, the number of repetitions for the RAR PDCCH are associated with synchronization signal blocks (SSBs) including a detected SSB. In various embodiments, the method 600 further comprises receiving the number of repetitions for the RAR PDCCH.

In one embodiment, the number of repetitions for the RAR PDCCH comprises a fixed value. In certain embodiments, the method 600 further comprises receiving the number of repetitions for the RAR PDCCH, wherein the number of repetitions is greater than a number of DMRS QCL assumptions, and the number of repetitions is grouped in orthogonal frequency division multiplexing (OFDM) symbols and each group of repetitions uses DMRS QCLed with different SSBs. In some embodiments, the number of repetitions for the RAR PDCCH is implicitly determined based on a number of best SSB beams indicated by the UE and the QCL assumption is based on a best reported SSB beam of the number of best SSB beams.

In various embodiments, the method 600 further comprises implicitly or explicitly reporting a beam correspondence update using the message 3. In one embodiment, the method 600 further comprises reporting RSRP for all configured repetitions of the number of repetitions. In certain embodiments, the method 600 further comprises reporting RSRP with values greater than a threshold value.

In some embodiments, the method 600 further comprises reporting only SSB identifiers (IDs) corresponding to the QCL assumptions of the RAR PDCCH with a highest RSRP or reports only one SSB ID corresponding to the highest RSRP. In various embodiments, the method 600 further comprises performing message 3 repetitions with the same number of repetitions corresponding to the number of the RAR PDCCH repetitions, and each message 3 repetition of the message 3 repetitions is performed with its corresponding QCL assumptions. In one embodiment, the second configuration for message 4 repetitions is based on the message 3 transmission.

In certain embodiments, the second configuration for message 4 repetitions is based on a highest RSRP among the number of received RAR PDCCH repetitions. In some embodiments, the message 3 transmission comprises multiple repetitions associated with multiple RSRPs or multiple SSB IDs. In various embodiments, the method 600 further comprises assuming QCL of a message 4 PDCCH QCLed with the SSB ID corresponding to a strongest RSRP among the number of repetitions.

In one embodiment, the method 600 further comprises receiving downlink control information (DCI) of the message 4 PDCCH, wherein the DCI comprises transmission configuration indicator (TCI) states for QCL assumptions of the number of repetitions with multiple beams QCLed with the rest of reported SSB IDs. In certain embodiments, the method 600 further comprises expecting a same number of message 4 PDCCH repetitions, message 4 PDSCH repetitions, or a combination thereof QCLed with SSB IDs reported.

In some embodiments, the second configuration received from the network device is received in SIBs related to the number of resources and a number of ports used for transmitting a channel state information (CSI) reference signal (RS) (CSI-RS). In various embodiments, the method 600 further comprises receiving multi-port CSI-RS within the RAR PDSCH slot with QCLs correspond to neighbor SSBs of detected SSB.

Figure 7:
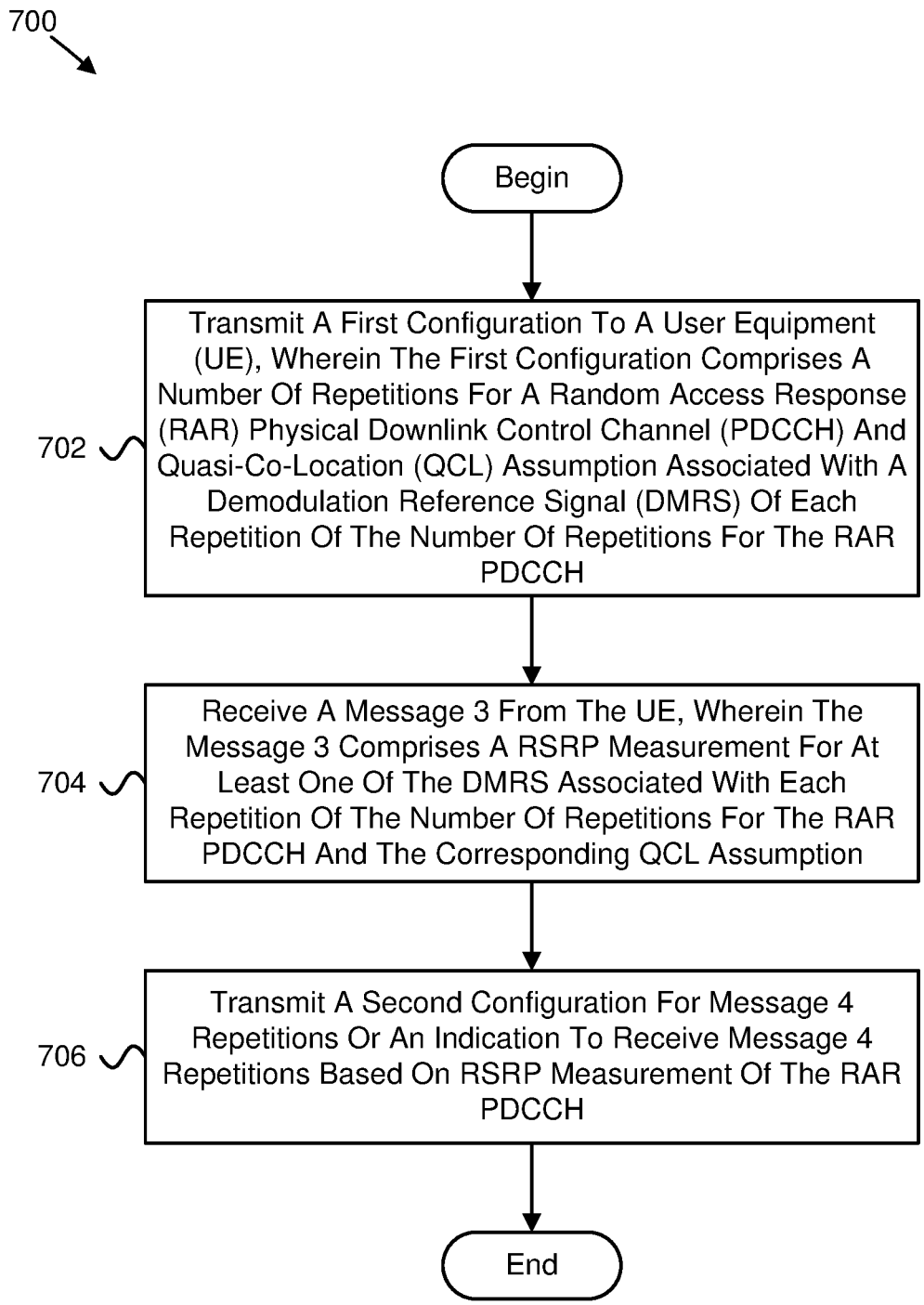
FIG. 7 is a flow chart diagram illustrating another embodiment of a method for a configuration based on a reference signal received power measurement.

FIG. 7 is a flow chart diagram illustrating one embodiment of a method 700 for a configuration based on a reference signal received power measurement. In some embodiments, the method 700 is performed by an apparatus, such as the remote unit 102. In certain embodiments, the method 700 may be performed by a processor executing program code, for example, a microcontroller, a microprocessor, a CPU, a GPU, an auxiliary processing unit, a FPGA, or the like.

In various embodiments, the method 700 includes transmitting 702, from a network device, a first configuration to a user equipment (UE). The first configuration includes a number of repetitions for a random access response (RAR) physical downlink control channel (PDCCH) and quasi-co-location (QCL) assumption associated with a demodulation reference signal (DMRS) of each repetition of the number of repetitions for the RAR PDCCH. In some embodiments, the method 700 includes receiving 704 a message 3 from the UE. The message 3 includes a RSRP measurement for at least one of the DMRS associated with each repetition of the number of repetitions for the RAR PDCCH and the corresponding QCL assumption. In certain embodiments, the method 700 includes transmitting 706 a second configuration for message 4 repetitions or an indication to receive message 4 repetitions based on RSRP measurement of the RAR PDCCH.

In certain embodiments, the first configuration is received from the network device in system information blocks (SIBs). In some embodiments, the number of repetitions for the RAR PDCCH are associated with synchronization signal blocks (SSBs) including a detected SSB. In various embodiments, the method 700 further comprises transmitting the number of repetitions for the RAR PDCCH.

In one embodiment, the number of repetitions for the RAR PDCCH comprises a fixed value. In certain embodiments, the method 700 further comprises transmitting the number of repetitions for the RAR PDCCH, wherein the number of repetitions is greater than a number of DMRS QCL assumptions, and the number of repetitions is grouped in orthogonal frequency division multiplexing (OFDM) symbols and each group of repetitions uses DMRS QCLed with different SSBs. In some embodiments, the number of repetitions for the RAR PDCCH is implicitly determined based on a number of best SSB beams indicated by the UE and the QCL assumption is based on a best reported SSB beam of the number of best SSB beams.

In various embodiments, the second configuration for message 4 repetitions is based on the message 3 reception. In one embodiment, the second configuration for message 4 repetitions is based on a highest RSRP among the number of transmitted RAR PDCCH repetitions. In certain embodiments, the message 3 reception comprises multiple repetitions associated with multiple RSRPs or multiple SSB IDs.

In some embodiments, the second configuration transmitted from the network device is transmitted in SIBs related to the number of resources and a number of ports used for transmitting a channel state information (CSI) reference signal (RS) (CSI-RS). In various embodiments, the method 700 further comprises transmitting multi-port CSI-RS within the RAR PDSCH slot with QCLs correspond to neighbor SSBs of detected SSB.

In one embodiment, an apparatus comprises a user equipment (UE). The apparatus further comprises: a receiver that receives a first configuration from a network device, wherein the first configuration comprises a number of repetitions for a random access response (RAR) physical downlink control channel (PDCCH) and quasi-co-location (QCL) assumption associated with a demodulation reference signal (DMRS) of each repetition of the number of repetitions for the RAR PDCCH; a processor that performs reference signal received power (RSRP) measurements on the DMRS associated with each repetition of the number of repetitions for the RAR PDCCH; and a transmitter that transmits a message 3 to the network, wherein the message 3 comprises a RSRP measurement for at least one of the DMRS associated with each repetition of the number of repetitions for the RAR PDCCH and the corresponding QCL assumption, wherein the receiver receives a second configuration for message 4 repetitions or an indication to receive message 4 repetitions based on RSRP measurement of the RAR PDCCH.

In certain embodiments, the first configuration is received from the network device in system information blocks (SIBs).

In some embodiments, the number of repetitions for the RAR PDCCH are associated with synchronization signal blocks (SSBs) including a detected SSB.

In various embodiments, the receiver receives the number of repetitions for the RAR PDCCH.

In one embodiment, the number of repetitions for the RAR PDCCH comprises a fixed value.

In certain embodiments, the receiver receives the number of repetitions for the RAR PDCCH, wherein the number of repetitions is greater than a number of DMRS QCL assumptions, and the number of repetitions is grouped in orthogonal frequency division multiplexing (OFDM) symbols and each group of repetitions uses DMRS QCLed with different SSBs.

In some embodiments, the number of repetitions for the RAR PDCCH is implicitly determined based on a number of best SSB beams indicated by the UE and the QCL assumption is based on a best reported SSB beam of the number of best SSB beams.

In various embodiments, the processor implicitly or explicitly reports a beam correspondence update using the message 3.

In one embodiment, the processor reports RSRP for all configured repetitions of the number of repetitions.

In certain embodiments, the processor reports RSRP with values greater than a threshold value.

In some embodiments, the processor reports only SSB identifiers (IDs) corresponding to the QCL assumptions of the RAR PDCCH with a highest RSRP or reports only one SSB ID corresponding to the highest RSRP.

In various embodiments, the processor performs message 3 repetitions with the same number of repetitions corresponding to the number of the RAR PDCCH repetitions, and each message 3 repetition of the message 3 repetitions is performed with its corresponding QCL assumptions.

In one embodiment, the second configuration for message 4 repetitions is based on the message 3 transmission.

In certain embodiments, the second configuration for message 4 repetitions is based on a highest RSRP among the number of received RAR PDCCH repetitions.

In some embodiments, the message 3 transmission comprises multiple repetitions associated with multiple RSRPs or multiple SSB IDs.

In various embodiments, the processor assumes QCL of a message 4 PDCCH QCLed with the SSB ID corresponding to a strongest RSRP among the number of repetitions.

In one embodiment, the receiver receives downlink control information (DCI) of the message 4 PDCCH, and the DCI comprises transmission configuration indicator (TCI) states for QCL assumptions of the number of repetitions with multiple beams QCLed with the rest of reported SSB IDs.

In certain embodiments, the processor expects a same number of message 4 PDCCH repetitions, message 4 PDSCH repetitions, or a combination thereof QCLed with SSB IDs reported.

In some embodiments, the second configuration received from the network device is received in SIBs related to the number of resources and a number of ports used for transmitting a channel state information (CSI) reference signal (RS) (CSI-RS).

In various embodiments, the receiver receives multi-port CSI-RS within the RAR PDSCH slot with QCLs correspond to neighbor SSBs of detected SSB.

In one embodiment, a method of a user equipment (UE) comprises: receiving a first configuration from a network device, wherein the first configuration comprises a number of repetitions for a random access response (RAR) physical downlink control channel (PDCCH) and quasi-co-location (QCL) assumption associated with a demodulation reference signal (DMRS) of each repetition of the number of repetitions for the RAR PDCCH: performing reference signal received power (RSRP) measurements on the DMRS associated with each repetition of the number of repetitions for the RAR PDCCH: transmitting a message 3 to the network, wherein the message 3 comprises a RSRP measurement for at least one of the DMRS associated with each repetition of the number of repetitions for the RAR PDCCH and the corresponding QCL assumption; and receiving a second configuration for message 4 repetitions or an indication to receive message 4 repetitions based on RSRP measurement of the RAR PDCCH.

In certain embodiments, the first configuration is received from the network device in system information blocks (SIBs).

In some embodiments, the number of repetitions for the RAR PDCCH are associated with synchronization signal blocks (SSBs) including a detected SSB.

In various embodiments, the method further comprises receiving the number of repetitions for the RAR PDCCH.

In one embodiment, the number of repetitions for the RAR PDCCH comprises a fixed value.

In certain embodiments, the method further comprises receiving the number of repetitions for the RAR PDCCH, wherein the number of repetitions is greater than a number of DMRS QCL assumptions, and the number of repetitions is grouped in orthogonal frequency division multiplexing (OFDM) symbols and each group of repetitions uses DMRS QCLed with different SSBs.

In some embodiments, the number of repetitions for the RAR PDCCH is implicitly determined based on a number of best SSB beams indicated by the UE and the QCL assumption is based on a best reported SSB beam of the number of best SSB beams.

In various embodiments, the method further comprises implicitly or explicitly reporting a beam correspondence update using the message 3.

In one embodiment, the method further comprises reporting RSRP for all configured repetitions of the number of repetitions.

In certain embodiments, the method further comprises reporting RSRP with values greater than a threshold value.

In some embodiments, the method further comprises reporting only SSB identifiers (IDs) corresponding to the QCL assumptions of the RAR PDCCH with a highest RSRP or reports only one SSB ID corresponding to the highest RSRP.

In various embodiments, the method further comprises performing message 3 repetitions with the same number of repetitions corresponding to the number of the RAR PDCCH repetitions, and each message 3 repetition of the message 3 repetitions is performed with its corresponding QCL assumptions.

In one embodiment, the second configuration for message 4 repetitions is based on the message 3 transmission.

In certain embodiments, the second configuration for message 4 repetitions is based on a highest RSRP among the number of received RAR PDCCH repetitions.

In some embodiments, the message 3 transmission comprises multiple repetitions associated with multiple RSRPs or multiple SSB IDs.

In various embodiments, the method further comprises assuming QCL of a message 4 PDCCH QCLed with the SSB ID corresponding to a strongest RSRP among the number of repetitions.

In one embodiment, the method further comprises receiving downlink control information (DCI) of the message 4 PDCCH, wherein the DCI comprises transmission configuration indicator (TCI) states for QCL assumptions of the number of repetitions with multiple beams QCLed with the rest of reported SSB IDs.

In certain embodiments, the method further comprises expecting a same number of message 4 PDCCH repetitions, message 4 PDSCH repetitions, or a combination thereof QCLed with SSB IDs reported.

In some embodiments, the second configuration received from the network device is received in SIBs related to the number of resources and a number of ports used for transmitting a channel state information (CSI) reference signal (RS) (CSI-RS).

In various embodiments, the method further comprises receiving multi-port CSI-RS within the RAR PDSCH slot with QCLs correspond to neighbor SSBs of detected SSB.

In one embodiment, an apparatus comprises a network device. The apparatus further comprises: a transmitter that transmits a first configuration to a user equipment (UE), wherein the first configuration comprises a number of repetitions for a random access response (RAR) physical downlink control channel (PDCCH) and quasi-co-location (QCL) assumption associated with a demodulation reference signal (DMRS) of each repetition of the number of repetitions for the RAR PDCCH; and a receiver that receives a message 3 from the UE, wherein the message 3 comprises a RSRP measurement for at least one of the DMRS associated with each repetition of the number of repetitions for the RAR PDCCH and the corresponding QCL assumption, wherein the transmitter that transmits a second configuration for message 4 repetitions or an indication to receive message 4 repetitions based on RSRP measurement of the RAR PDCCH.

In certain embodiments, the first configuration is received from the network device in system information blocks (SIBs).

In some embodiments, the number of repetitions for the RAR PDCCH are associated with synchronization signal blocks (SSBs) including a detected SSB.

In various embodiments, the transmitter transmits the number of repetitions for the RAR PDCCH.

In one embodiment, the number of repetitions for the RAR PDCCH comprises a fixed value.

In certain embodiments, the transmitter transmits the number of repetitions for the RAR PDCCH, the number of repetitions is greater than a number of DMRS QCL assumptions, and the number of repetitions is grouped in orthogonal frequency division multiplexing (OFDM) symbols and each group of repetitions uses DMRS QCLed with different SSBs.

In some embodiments, the number of repetitions for the RAR PDCCH is implicitly determined based on a number of best SSB beams indicated by the UE and the QCL assumption is based on a best reported SSB beam of the number of best SSB beams.

In various embodiments, the second configuration for message 4 repetitions is based on the message 3 reception.

In one embodiment, the second configuration for message 4 repetitions is based on a highest RSRP among the number of transmitted RAR PDCCH repetitions.

In certain embodiments, the message 3 reception comprises multiple repetitions associated with multiple RSRPs or multiple SSB IDs.

In some embodiments, the second configuration transmitted from the network device is transmitted in SIBs related to the number of resources and a number of ports used for transmitting a channel state information (CSI) reference signal (RS) (CSI-RS).

In various embodiments, the transmitter transmits multi-port CSI-RS within the RAR PDSCH slot with QCLs correspond to neighbor SSBs of detected SSB.

In one embodiment, a method of a network device comprises: transmitting a first configuration to a user equipment (UE), wherein the first configuration comprises a number of repetitions for a random access response (RAR) physical downlink control channel (PDCCH) and quasi-co-location (QCL) assumption associated with a demodulation reference signal (DMRS) of each repetition of the number of repetitions for the RAR PDCCH: receiving a message 3 from the UE, wherein the message 3 comprises a RSRP measurement for at least one of the DMRS associated with each repetition of the number of repetitions for the RAR PDCCH and the corresponding QCL assumption; and transmitting a second configuration for message 4 repetitions or an indication to receive message 4 repetitions based on RSRP measurement of the RAR PDCCH.

In certain embodiments, the first configuration is received from the network device in system information blocks (SIBs).

In some embodiments, the number of repetitions for the RAR PDCCH are associated with synchronization signal blocks (SSBs) including a detected SSB.

In various embodiments, the method further comprises transmitting the number of repetitions for the RAR PDCCH.

In one embodiment, the number of repetitions for the RAR PDCCH comprises a fixed value.

In certain embodiments, the method further comprises transmitting the number of repetitions for the RAR PDCCH, wherein the number of repetitions is greater than a number of DMRS QCL assumptions, and the number of repetitions is grouped in orthogonal frequency division multiplexing (OFDM) symbols and each group of repetitions uses DMRS QCLed with different SSBs.

In some embodiments, the number of repetitions for the RAR PDCCH is implicitly determined based on a number of best SSB beams indicated by the UE and the QCL assumption is based on a best reported SSB beam of the number of best SSB beams.

In various embodiments, the second configuration for message 4 repetitions is based on the message 3 reception.

In one embodiment, the second configuration for message 4 repetitions is based on a highest RSRP among the number of transmitted RAR PDCCH repetitions.

In certain embodiments, the message 3 reception comprises multiple repetitions associated with multiple RSRPs or multiple SSB IDs.

In some embodiments, the second configuration transmitted from the network device is transmitted in SIBs related to the number of resources and a number of ports used for transmitting a channel state information (CSI) reference signal (RS) (CSI-RS).

In various embodiments, the method further comprises transmitting multi-port CSI-RS within the RAR PDSCH slot with QCLs correspond to neighbor SSBs of detected SSB.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE), the apparatus comprising:
at least one memory; and
at least one processor coupled with the at least one memory and configured to cause the UE to:
receive a first configuration from a network device, wherein the first configuration comprises a number of repetitions for a random access response (RAR) physical downlink control channel (PDCCH) and quasi-co-location (QCL) assumption associated with a demodulation reference signal (DMRS) of each repetition of the number of repetitions for the RAR PDCCH;
perform reference signal received power (RSRP) measurements on the DMRS associated with each repetition of the number of repetitions for the RAR PDCCH;
transmit a message 3 to the network, wherein the message 3 comprises a RSRP measurement for at least one of the DMRS associated with each repetition of the number of repetitions for the RAR PDCCH and the corresponding QCL assumption; and
receive a second configuration for message 4 repetitions or an indication to receive message 4 repetitions based on RSRP measurement of the RAR PDCCH.

2. The UE of claim 1, wherein the first configuration is received from the network device in system information blocks (SIBs).

3. The UE of claim 1, wherein the number of repetitions for the RAR PDCCH are associated with synchronization signal blocks (SSBs) including a detected SSB.

4. The UE of claim 1, wherein the at least one processor is configured to cause the UE to receive the number of repetitions for the RAR PDCCH.

5. The UE of claim 1, wherein the number of repetitions for the RAR PDCCH is implicitly determined based on a number of best SSB beams indicated by the UE and the QCL assumption is based on a best reported SSB beam of the number of best SSB beams.

6. The UE of claim 1, wherein the at least one processor is configured to cause the UE to implicitly or explicitly report a beam correspondence update using the message 3.

7. The UE of claim 1, wherein the at least one processor is configured to cause the UE to report RSRP for all configured repetitions of the number of repetitions.

8. The UE of claim 1, wherein the at least one processor is configured to cause the UE to report RSRP with values greater than a threshold value.

9. The UE of claim 1, wherein the at least one processor is configured to cause the UE to report only SSB identifiers (IDs) corresponding to the QCL assumptions of the RAR PDCCH with a highest RSRP or reports only one SSB ID corresponding to the highest RSRP.

10. The UE of claim 1, wherein the at least one processor is configured to cause the UE to perform message 3 repetitions with the same number of repetitions corresponding to the number of the RAR PDCCH repetitions, and each message 3 repetition of the message 3 repetitions is performed with its corresponding QCL assumptions.

11. The UE of claim 1, wherein the second configuration for message 4 repetitions is based on the message 3 transmission.

12. The UE of claim 1, wherein the second configuration for message 4 repetitions is based on a highest RSRP among the number of received RAR PDCCH repetitions.

13. The UE of claim 1, wherein the message 3 transmission comprises multiple repetitions associated with multiple RSRPs or multiple SSB IDs, the at least one processor is configured to cause the UE to QCL of a message 4 PDCCH QCLed with the SSB ID corresponding to a strongest RSRP among the number of repetitions and receive downlink control information (DCI) of the message 4 PDCCH, and the DCI comprises transmission configuration indicator (TCI) states for QCL assumptions of the number of repetitions with multiple beams QCLed with the rest of reported SSB IDs.

14. A method performed by a user equipment (UE), the method comprising:
receiving a first configuration from a network device, wherein the first configuration comprises a number of repetitions for a random access response (RAR) physical downlink control channel (PDCCH) and quasi-co-location (QCL) assumption associated with a demodulation reference signal (DMRS) of each repetition of the number of repetitions for the RAR PDCCH;
performing reference signal received power (RSRP) measurements on the DMRS associated with each repetition of the number of repetitions for the RAR PDCCH;
transmitting a message 3 to the network, wherein the message 3 comprises a RSRP measurement for at least one of the DMRS associated with each repetition of the number of repetitions for the RAR PDCCH and the corresponding QCL assumption; and
receiving a second configuration for message 4 repetitions or an indication to receive message 4 repetitions based on RSRP measurement of the RAR PDCCH.

15. A base station, comprising:
at least one memory; and
at least one processor coupled with the at least one memory and configured to cause the base station to:
transmit a first configuration to a user equipment (UE), wherein the first configuration comprises a number of repetitions for a random access response (RAR) physical downlink control channel (PDCCH) and quasi-co-location (QCL) assumption associated with a demodulation reference signal (DMRS) of each repetition of the number of repetitions for the RAR PDCCH;
receive a message 3 from the UE, wherein the message 3 comprises a RSRP measurement for at least one of the DMRS associated with each repetition of the number of repetitions for the RAR PDCCH and the corresponding QCL assumption; and
transmit a second configuration for message 4 repetitions or an indication to receive message 4 repetitions based on RSRP measurement of the RAR PDCCH.

16. A processor for wireless communication, comprising:
at least one controller coupled with at least one memory and configured to cause the processor to:
receive a first configuration from a network device, wherein the first configuration comprises a number of repetitions for a random access response (RAR) physical downlink control channel (PDCCH) and quasi-co-location (QCL) assumption associated with a demodulation reference signal (DMRS) of each repetition of the number of repetitions for the RAR PDCCH;
perform reference signal received power (RSRP) measurements on the DMRS associated with each repetition of the number of repetitions for the RAR PDCCH;
transmit a message 3 to the network, wherein the message 3 comprises a RSRP measurement for at least one of the DMRS associated with each repetition of the number of repetitions for the RAR PDCCH and the corresponding QCL assumption; and
receive a second configuration for message 4 repetitions or an indication to receive message 4 repetitions based on RSRP measurement of the RAR PDCCH.

17. The processor of claim 16, wherein the first configuration is received from the network device in system information blocks (SIBs).

18. The processor of claim 16, wherein the number of repetitions for the RAR PDCCH are associated with synchronization signal blocks (SSBs) including a detected SSB.

19. The processor of claim 16, wherein the at least one controller is configured to cause the processor to receive the number of repetitions for the RAR PDCCH.

20. The processor of claim 16, wherein the number of repetitions for the RAR PDCCH is implicitly determined based on a number of best SSB beams indicated by the processor and the QCL assumption is based on a best reported SSB beam of the number of best SSB beams.

* * * * *